US008706653B2

(12) United States Patent
Kasneci et al.

(10) Patent No.: US 8,706,653 B2
(45) Date of Patent: Apr. 22, 2014

(54) KNOWLEDGE CORROBORATION

(75) Inventors: Gjergji Kasneci, Cambridge (GB); Jurgen Anne Francois Marie Van Gael, Cambridge (GB); Thore Kraepel, Cambridge (GB); Ralf Herbrich, Cambridge (GB); David Stern, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 408 days.

(21) Appl. No.: 12/963,352

(22) Filed: Dec. 8, 2010

(65) Prior Publication Data

US 2012/0150771 A1 Jun. 14, 2012

(51) Int. Cl.
*G06F 15/18* (2006.01)
(52) U.S. Cl.
USPC .......................................................... 706/12
(58) Field of Classification Search
None
See application file for complete search history.

(56) References Cited

U.S. PATENT DOCUMENTS

| | | | | | |
|---|---|---|---|---|---|
| 4,593,367 | A | * | 6/1986 | Slack et al. | 706/12 |
| 4,599,692 | A | * | 7/1986 | Tan et al. | 706/12 |
| 4,620,286 | A | * | 10/1986 | Smith et al. | 706/12 |
| 5,701,400 | A | * | 12/1997 | Amado | 706/45 |
| 6,032,141 | A | * | 2/2000 | O'Connor et al. | 706/45 |
| 7,428,521 | B2 | * | 9/2008 | Horvitz et al. | 706/52 |
| 7,613,670 | B2 | * | 11/2009 | Horvitz et al. | 706/46 |
| 7,801,896 | B2 | * | 9/2010 | Szabo | 707/739 |
| 7,885,905 | B2 | * | 2/2011 | Heckerman et al. | 706/12 |
| 2003/0126136 | A1 | * | 7/2003 | Omoigui | 707/10 |
| 2005/0096950 | A1 | | 5/2005 | Caplan et al. | |
| 2007/0156677 | A1 | * | 7/2007 | Szabo | 707/5 |
| 2007/0192106 | A1 | | 8/2007 | Zilca | |
| 2007/0208570 | A1 | * | 9/2007 | Bhardwaj et al. | 704/270.1 |
| 2008/0004954 | A1 | * | 1/2008 | Horvitz | 705/14 |
| 2008/0005095 | A1 | | 1/2008 | Horvitz et al. | |
| 2008/0065471 | A1 | * | 3/2008 | Reynolds et al. | 705/10 |
| 2008/0162394 | A1 | * | 7/2008 | Horvitz et al. | 706/46 |
| 2009/0049000 | A1 | * | 2/2009 | Hadar | 706/50 |
| 2009/0054123 | A1 | * | 2/2009 | Mityagin et al. | 463/9 |
| 2009/0254572 | A1 | * | 10/2009 | Redlich et al. | 707/10 |

(Continued)

OTHER PUBLICATIONS

Carpenter, "Multilevel Bayesian Models of Categorical Data Annotation", retrieved on Sep. 23, 2010 at <<http://lingpipe.files.wordpress.com/2008/11/carp-bayesian-multilevel-annotation.pdf>>, Technical Report, 2009, pp. 1-52.

(Continued)

*Primary Examiner* — Kakali Chaki
*Assistant Examiner* — Fuming Wu
(74) *Attorney, Agent, or Firm* — Pablo Tapia; Jim Ross; Micky Minhas

(57) ABSTRACT

Knowledge corroboration is described. In an embodiment many judges provide answers to many questions so that at least one answer is provided to each question and at least some of the questions have answers from more than one judge. In an example a probabilistic learning system takes features describing the judges or the questions or both and uses those features to learn an expertise of each judge. For example, the probabilistic learning system has a graphical assessment component which aggregates the answers in a manner which takes into account the learnt expertise in order to determine enhanced answers. In an example the enhanced answers are used for knowledge base clean-up or web-page classification and the learnt expertise is used to select judges for future questions. In an example the probabilistic learning system has a logical component that propagates answers according to logical relations between the questions.

19 Claims, 16 Drawing Sheets

(56) References Cited

U.S. PATENT DOCUMENTS

| | | | |
|---|---|---|---|
| 2009/0299812 A1* | 12/2009 | Ray | 705/9 |
| 2010/0017348 A1* | 1/2010 | Pinckney et al. | 706/11 |
| 2010/0070448 A1* | 3/2010 | Omoigui | 706/47 |
| 2010/0112532 A1* | 5/2010 | Kakui | 434/129 |
| 2010/0250497 A1* | 9/2010 | Redlich et al. | 707/661 |
| 2010/0332583 A1* | 12/2010 | Szabo | 709/202 |
| 2011/0131163 A1* | 6/2011 | Stern et al. | 706/13 |
| 2011/0319724 A1* | 12/2011 | Cox | 600/301 |
| 2012/0288845 A1* | 11/2012 | Kumar GL | 434/362 |

OTHER PUBLICATIONS

Fadel, et al., "Elaboration Likelihood in Knowledge Management: A Model and Experimental Test", retrieved on Sep. 23, 2010 at <<http://ieeexplore.ieee.org/stamp/stamp.jsp?tp=&arnumber=4439064>>, IEEE Proceedings of Hawaii Intl Conference on System Sciences, 2008, pp. 1-10.

Galland, et al., "Corroborating Information from Disagreeing Views", retrieved on Sep. 23, 2010 at <<http://hal.archives-ouvertes.fr/docs/00/42/95/46/PDF/document.pdf>>, Intl Conference on Web Search and Data Mining (WSDM), 2010, pp. 1-10.

Hartonas, et al., "Adaptivity for Knowledge Content in the Semantic Web", retrieved on Sep. 23, 2010 at <<http://users.teilar.gr/~hartonas/KGCM-08-Hartonas.pdf>>, Proceedings of Conference on Knowledge Generation, Communication and Management (KGCM), Orlando, Florida, 2008, pp. 1-7.

Kasneci, et al., "Bayesian Knowledge Corroboration with Logical Rules and User Feedback", retrieved on Sep. 23, 2010 at <<http://research.microsoft.com/pubs/131121/kasneciTR2010.pdf>>, Microsoft Research, Microsoft Corporation, TechReport MSR-TR-2010-45, May 2010, pp. 1-18.

Koide, et al., "Decision Support System for Rocket Launch Using Semantic Web Services", retrieved on Sep. 23, 2010 at <<http://www.ra.ethz.ch/CDstore/www2005-ws/workshop/wf11/11-koide.pdf>>, WWW Workshop on Semantic Web Technologies in Japan, 2005, pp. 1-4.

McCool, et al., "Semantic Issues in Web-Scale Knowledge Aggregation", retrieved on Sep. 23, 2010 at <<http://74.125.155.132/scholar?q=cache:ie275BktyoQJ:scholar.google.com/&hl=en&as_sdt=2000>>, Knowledge Systems Laboratory, 2003, pp. 1-15.

Ramakrishnan, et al., "A Framework for Schema-Driven Relationship Discovery from Unstructured text", retrieved on Sep. 23, 2010 at <<http://citeseerx.ist.psu.edu/viewdoc/download?doi=10.1.1.98.7627&rep=rep1&type=pdf>>, Springer, Lecture Notes in Computer Science, vol. 4273, Proceedings of Intl Semantic Web Conference (ISWC), Athens, Georgia, Nov. 2006, pp. 583-596.

Raykar, et al., "Learning From Crowds", retrieved on Sep. 23, 2010 at <<http://www.umiacs.umd.edu/users/vikas/publications/raykar_JMLR_2010_crowds.pdf>>, Journal of Machine Learning Research, vol. 11, 2010, pp. 1297-1322.

* cited by examiner

FIG. 14

| Symbol | Meaning |
|---|---|
| $t_j \in \{T, F\}$ | Truth value of statement $j$ |
| $\mathcal{D}_j$ | Set of truth values from which statement $j$ can be derived |
| $a_{ij}$ | Assessment of user $i$ about statement $j$ |
| $u_{ij} \in \{T, F\}$ | Correctness of user $i$'s assessment of statement $j$ |
| $\tilde{u}_{ij} \in \mathbb{R}$ | Expertise of user $i$ when assessing statement $j$ |
| $\mathbf{x}_i \in \mathbb{R}^{d_x}$ | Feature vector describing user $i$ |
| $\mathbf{y}_j \in \mathbb{R}^{d_y}$ | Feature vector describing statement $j$ |
| $\mathbf{s}_i \in \mathbb{R}^z$ | Latent expertise vector of user $i$ |
| $\mathbf{z}_j \in \mathbb{R}^z$ | Latent expertise vector of statement $j$ |
| $\mathbf{V} \in \mathbb{R}^{d_x} \times \mathbb{R}^z$ | Linear mapping from user feature space to latent expertise space |
| $\mathbf{W} \in \mathbb{R}^{d_y} \times \mathbb{R}^z$ | Linear mapping from statement feature space to latent expertise space |
| $r_{ij} \in \mathbb{R}$ | Affinity of user $i$ and statement $j$ in latent expertise space |
| $\mathbf{v}_0 \in \mathbb{R}^{d_x}$ | Weight vector of linear expertise model from user features |
| $\mathbf{w}_0 \in \mathbb{R}^{d_y}$ | Weight vector of linear expertise model from statement features |
| $r_0 \in \mathbb{R}$ | Threshold variable for expertise |

FIG. 15

KNOWLEDGE CORROBORATION

BACKGROUND

Knowledge corroboration involves trying to exploit the "wisdom of the crowds" by using knowledge from many different people, organizations, committees, enterprises, automated systems or other entities. For example, a majority voting system is one example of knowledge corroboration where many people vote on an issue and the majority vote is used as the outcome.

Knowledge corroboration is difficult where the knowledge of the individuals to be corroborated is poor or very variable and where some individuals may act maliciously by reporting false information on purpose. In addition, in order to exploit knowledge corroboration, large scale systems are needed in order to corroborate knowledge from large numbers of entities. Providing knowledge corroboration solutions which are efficient and which scale up for use with huge amounts of data is difficult.

The embodiments described below are not limited to implementations which solve any or all of the disadvantages of known systems for knowledge corroboration.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Knowledge corroboration is described. In an embodiment many judges provide answers to many questions so that at least one answer is provided to each question and at least some of the questions have answers from more than one judge. In an example a probabilistic learning system takes features describing the judges or the questions or both and uses those features to learn an expertise of each judge. For example, the probabilistic learning system has a graphical assessment component which aggregates the answers in a manner which takes into account the learnt expertise in order to determine enhanced answers. In an example the enhanced answers are used for knowledge base clean-up or web-page classification and the learnt expertise is used to select judges for future questions. In an example the probabilistic learning system has a logical component that propagates answers according to logical relations between the questions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 14 is a table of components of a graphical structure of a probabilistic learning system, their corresponding factor graph structures and the associated computational instructions;

FIG. 15 is a table of mathematical symbols used in this document and their meanings;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a knowledge base clean up system and a web page classification system, the systems described are provided as examples and not a limitation. As those skilled in the art will appreciate, the present examples are suitable for application in a variety of different types of knowledge corroboration systems.

Figure 1:
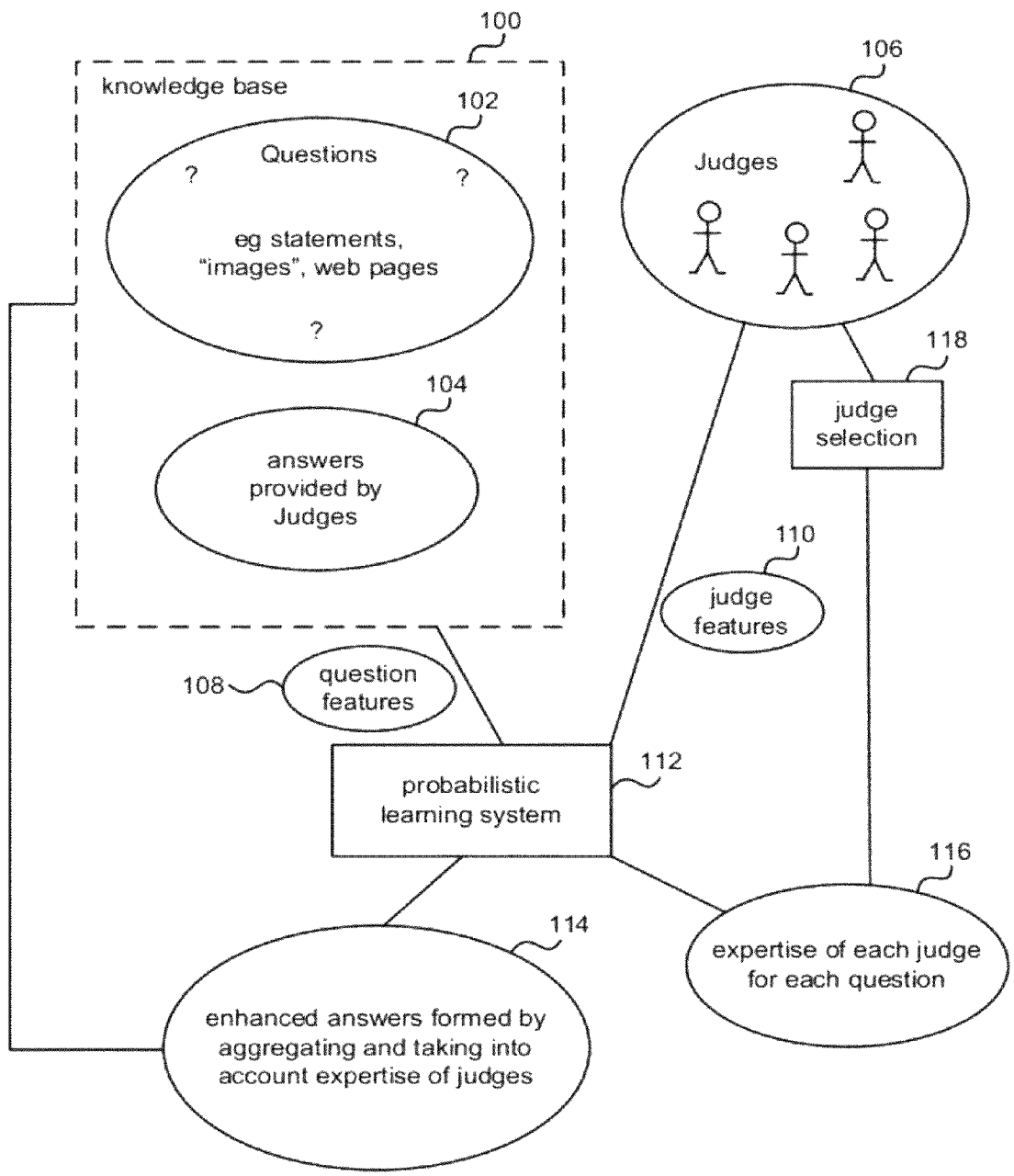
FIG. 1 is a schematic diagram of a probabilistic learning system arranged for knowledge corroboration.

FIG. 1 is a schematic diagram of an example probabilistic learning system 112 for knowledge corroboration. A plurality of judges 106 (also referred to as assessors or users) who may be individuals, enterprises, organizations, automated entities, web services, or other entities provide answers 104 to questions 102. For example, the questions may be Is the statement "Albert Einstein was a physicist" true?, or questions about other statements which link entities using relationships, items to be classified such as images, web pages, emails, blogs, documents, knowledge fragments, or combinations of parts of such items; or other questions related to medical diagnosis, fault detection, test questions etc. The questions may require multiple choice answers, true/false answers, quantitative answers or other types of answer. The questions 102 and answers 104 may be stored in a knowledge base 100 although this is not essential.

Judge features 110, which are characteristics describing the judges are available to the probabilistic learning system 112. For example, the judge features may be an identifier of each judge and/or attributes of the judges such as their profession, age, nationality, gender etc.

Question features 108 are available to the probabilistic learning system 112. For example, questions features 108 may be an identifier of each question and/or attributes of the questions such as type of question, area of knowledge, appearance of certain words in the question etc.

The probabilistic learning system provides enhanced answers to the questions which exploit the "wisdom of the crowds". The enhanced answers are formed by aggregating and taking into account the expertise (or trustworthiness) of the judges. The expertise of the judges 116 is also learnt by the probabilistic learning system. In some examples the expertise of each judge for each question is learnt and in other examples an overall expertise of each judge is learnt. The enhanced answers may be fed back into the knowledge base 100. Also, the learnt expertise may be used by a judge selection system 118 to select judges 106 for future questions or to reward judges differently depending on their expertise or trustworthiness.

The probabilistic learning system is able to determine the enhanced answers and learn the expertise of the judges without the need for any ground truth knowledge about the judge expertise and/or the answers to the questions. The probabilistic learning system is arranged to take into account uncertainty in the answers provided by the judges and so is able to cope with judges who guess, judges who give poor answers and judges who give malicious answers. Judges may often act inconsistently or unreliably and give inaccurate feedback across knowledge domains. The background knowledge of judges may vary across knowledge domains. For example, the majority of people from the "crowd" may not know that Barack Obama has won a Grammy Award. In such a case the probabilistic learning system is able to identify the few experts in the crowd of judges who may know the truth. The probabilistic learning system is able to give enhanced answers which are better than a simple majority voting system would achieve when aggregating answers of the judges. This is the case for example, where there is at least one answer for each question and where there are multiple answers from different judges for at least a plurality of the questions. Generally speaking, the more answers there are from different judges for the same questions the better the accuracy of the enhanced answers. In some examples, the probabilistic learning system has a logical component which is able to exploit logical relations which exist between the questions in order to make deductions and add to the knowledge base 100 and also to propagate knowledge in the probabilistic learning system according to the logical relations.

Figure 2:
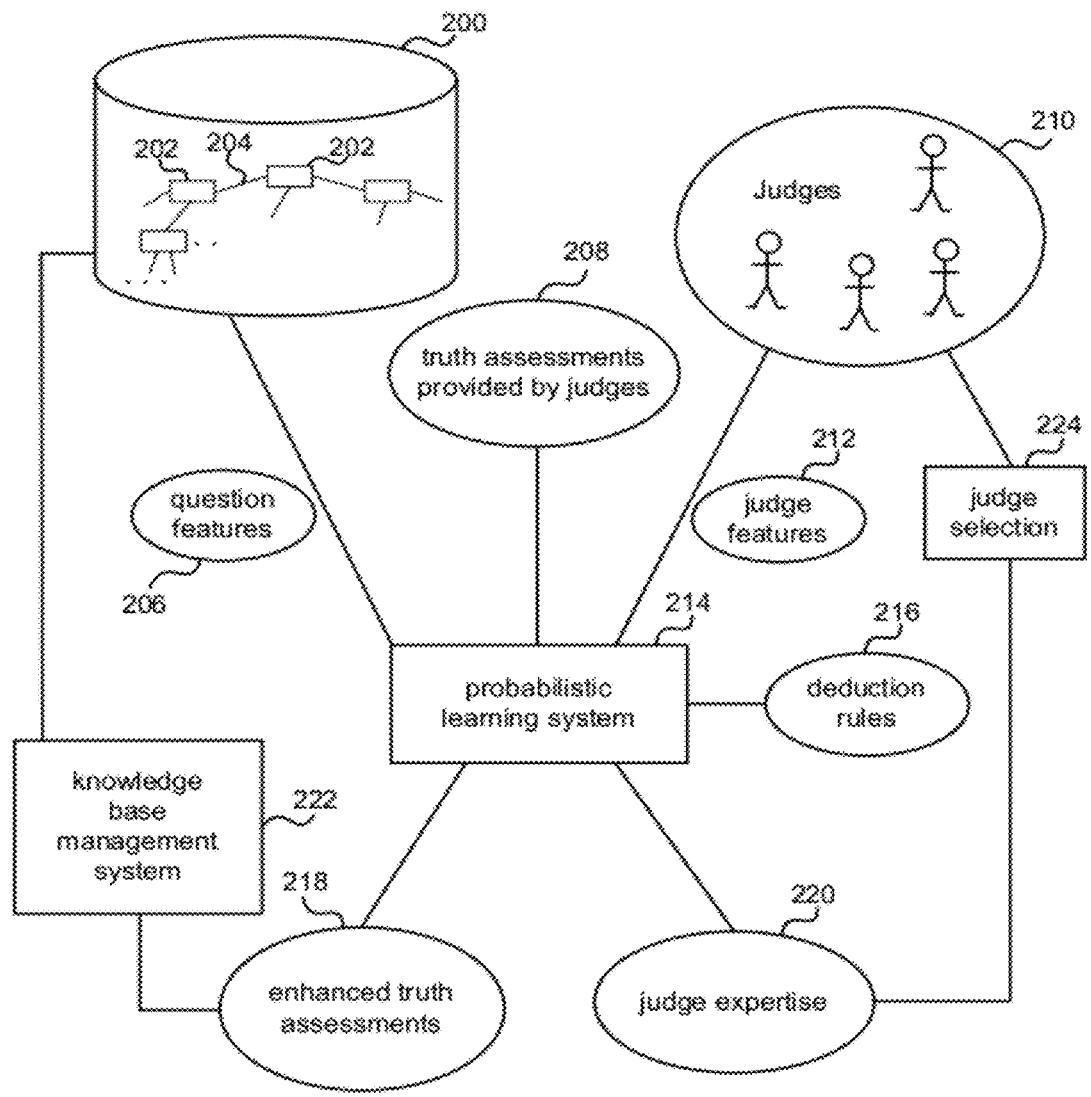
FIG. 2 is a schematic diagram of a probabilistic learning system used for knowledge base clean-up.

FIG. 2 illustrates an example where a probabilistic learning system 214 is used for knowledge base clean-up. A knowledge base 200 stores entity-relationship-entity triple statements. This is illustrated schematically in FIG. 2 by nodes 202 representing entities linked by edges 204 that represent relationships. For example, an entity-relationship-entity statement may be "Albert Einstein was a physicist" where "Albert Einstein" and "physicist" are entities and "was a" is a relationship. For example, the knowledge base may be structured using a semantic-web formalism such as resource description framework (RDFS) or another type of schema language for knowledge representation.

A plurality of judges 210 provide truth assessments 208 of the triple statements in the knowledge base. The judges may be any type of judges as described above with reference to FIG. 1. The triple statements are an example of a type of question as described with reference to FIG. 1. The probabilistic learning system 214 receives or accesses question features 206 and/or judge features 212 and optionally, deduction rules 216. The deduction rules may be preconfigured at the probabilistic learning system 214 or may be configured by an operator. Examples of deduction rules 216 are reflexivity, transitivity and reasoning over domains and ranges of the questions. In embodiments where the probabilistic learning system has no logical component the deduction rules are not required.

The probabilistic learning system determines enhanced truth assessments 218 in a similar manner as for the enhanced answers described above with reference to FIG. 1. These enhanced truth assessments are used by a knowledge base management system together with configured thresholds or other criteria to clean-up the triple statements in the knowledge base 200. Empirical testing and analysis may be carried out offline to select appropriate thresholds and criteria to use in this clean-up process.

The probabilistic learning system also provides learnt judge expertise 220 information which may be used by a judge selection system 224 to select judges for assessing further triple statements and/or to reward judges based on their expertise.

Figure 3:
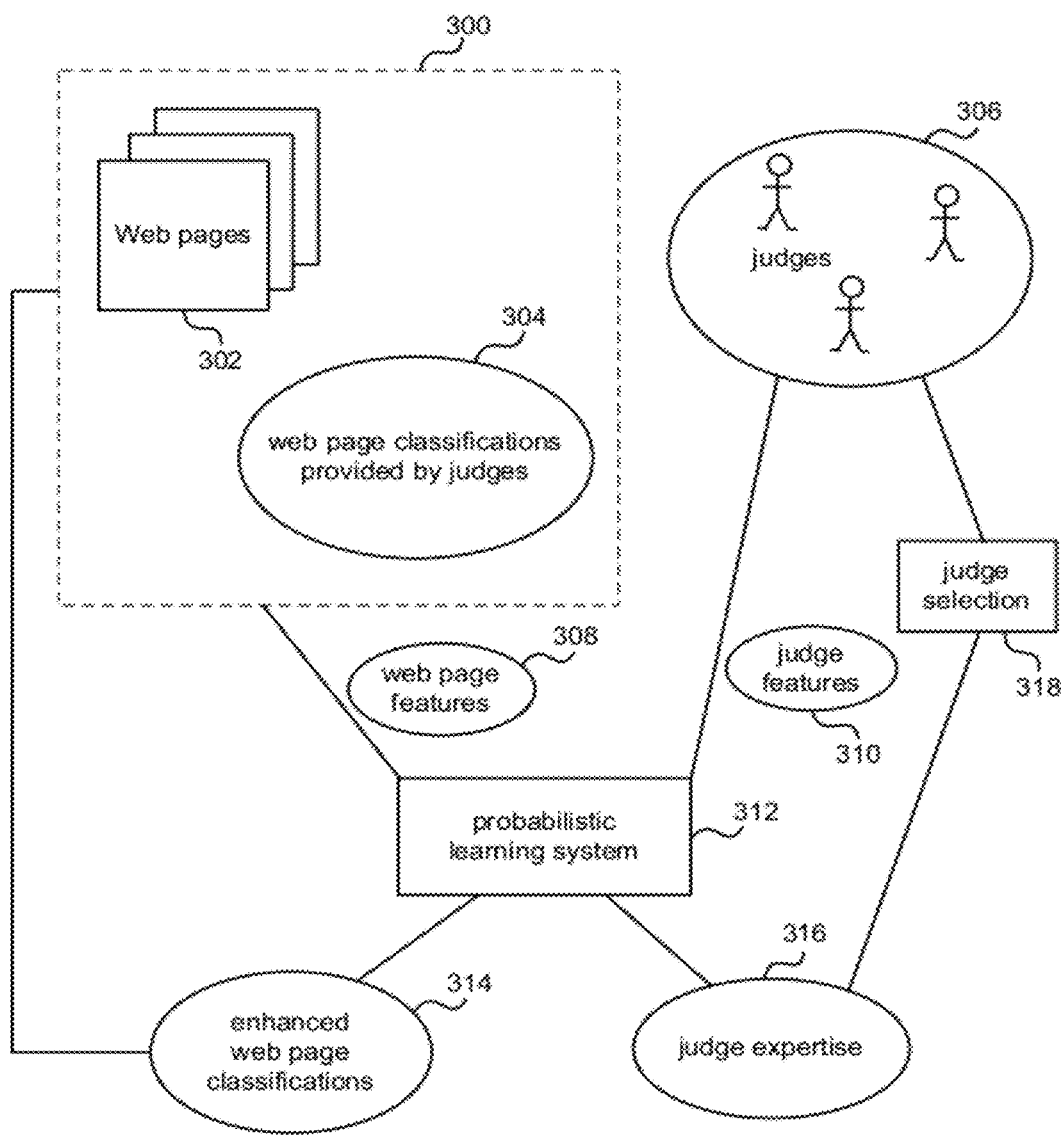
FIG. 3 is a schematic diagram of a probabilistic learning system used for web-page classification.

FIG. 3 illustrates an example where the probabilistic learning system is used as part of a document classification system such as a web-page classification system. Web-pages 320 or parts of web pages are classified by judges 306 into specified categories. This example is also applicable to other types of documents (or parts of documents) including but not limited to: emails, blogs, images, files, text messages, voice mail messages, audio files. In this case the questions of FIG. 1 ask about the classification of web pages and the web page classifications are the answers to the questions. The web pages 302 or references to those pages may be stored in a knowledge base 300 with the associated classifications although this is not essential. Features of the web pages 308 and features of the judges 310 are input to the probabilistic learning system 312 which determines enhanced web page classifications that take into account the "wisdom of the crowds" in a manner that weights contributions from the judges according to a learnt indication of the expertise of each judge 316. The enhanced web page classifications 314 may be stored and/or used to update the knowledge base. The learnt judge expertise information may be used to select judges using a judge selection system 318 which may be computer implemented. Often judges may be paid to classify web pages and so this type of judge selection system can improve performance by reducing the number of judges that need to be used and the number of web page classifications that need to be made. Also, the payment can be used to reward judges based on their expertise.

Figure 4:
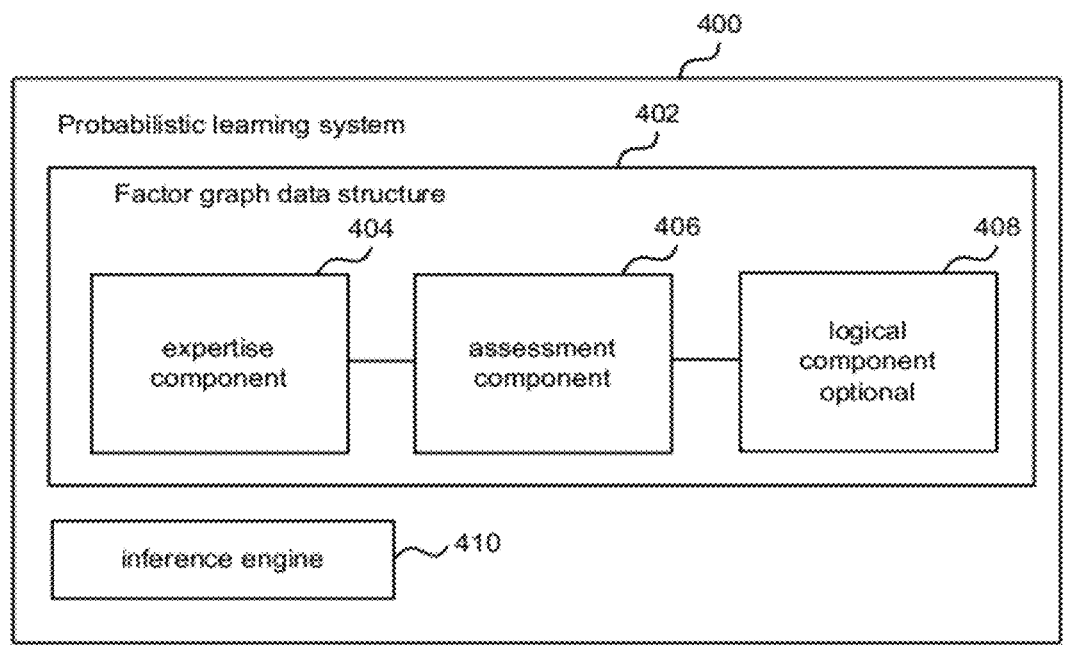
FIG. 4 is a schematic diagram of a probabilistic learning system having an assessment component and an expertise component.

More detail about a probabilistic learning system 400 is now given with reference to FIG. 4. The probabilistic learning system uses a factor graph data structure 402 comprising at least two and in some embodiments three components. An inference engine 410 carries out inference using the factor graph data structure by carrying out message passing. For example approximate message passing based on a combination of expectation propagation and variational message passing may be used as described in more detail below. The three components mentioned above are: an expertise component 404, which is used to learn about expertise of judges; a logical component 408, which is optional and which is used to make deductions about the questions as well as to propagate information according to logical relations between the questions; and an assessment component 406 which is used to aggregate answers made by the judges in a manner weighted by the learnt expertise in order to learn enhanced answers to the questions. Each of these components may be used as an independent module.

In some examples the inference engine 410 carries out message passing over the factor graph data structure components according to an inference schedule. For example, this may comprise running inference on the expertise component and then switching iteratively between that component and the remaining components of the probabilistic learning system. However, any suitable inference schedule may be used.

Figure 5:
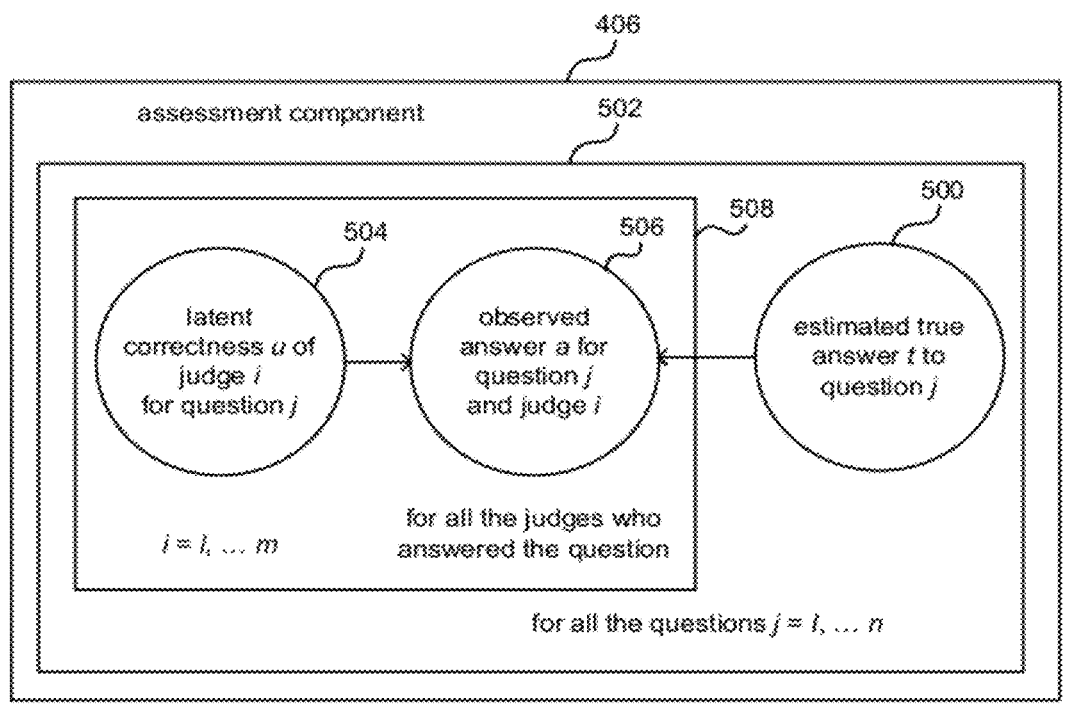
FIG. 5 is a schematic diagram of an assessment component of a probabilistic learning system.

In an example the assessment component 406 comprises a graphical data structure 502 as illustrated schematically in FIG. 5. This graphical data structure is a higher level representation of a factor graph data structure. Details of how to translate or map from this type of graphical data structure to a factor graph data structure are given in FIG. 14. The graphical data structure of the assessment component 406 comprises one node 500 for each estimated true answer t to question j. This may also be referred to as a latent enhanced answer t to question j. The word "latent" can be thought of as meaning "unobserved" or a variable which the probabilistic learning system is trying to learn. FIG. 5 shows one node 500 representing an estimated true answer to be learnt and indicates by the box 502 being "for all the questions j=1 to n that there are n such nodes in the assessment component. Each node representing an estimated true answer is connected to nodes 506 for each observed answer to that question. Only one such node 506 is shown in FIG. 5 for clarity although the indexing in box 508 indicates that there are many such nodes, one for each observed answer to the question. Each node representing an observed answer a is in turn connected to at least one node 504 representing a latent indication of the expertise of the judge concerned. In this example, a latent indication of the expertise of each judge for each question is learnt. In other embodiments two nodes are used to represent an overall latent indication of the expertise of the judge (which is not question specific). For example, see FIG. 7 below.

The assessment component 406 thus comprises a graphical structure which comprises a node representing a learnt estimated true answer connected to, one node for each observed answer to be aggregated to the estimated true answer. Each of the nodes for the observed answers may be connected to at least one node representing a learnt expertise indicator of a judge who gave the observed answer.

In some examples the assessment component is able to cope with situations where judges guess the answers to questions in the event that they do not know the answer. This may be achieved by using a node 600 representing a guessing probability which is learnt by the probabilistic learning system.

Figure 7:
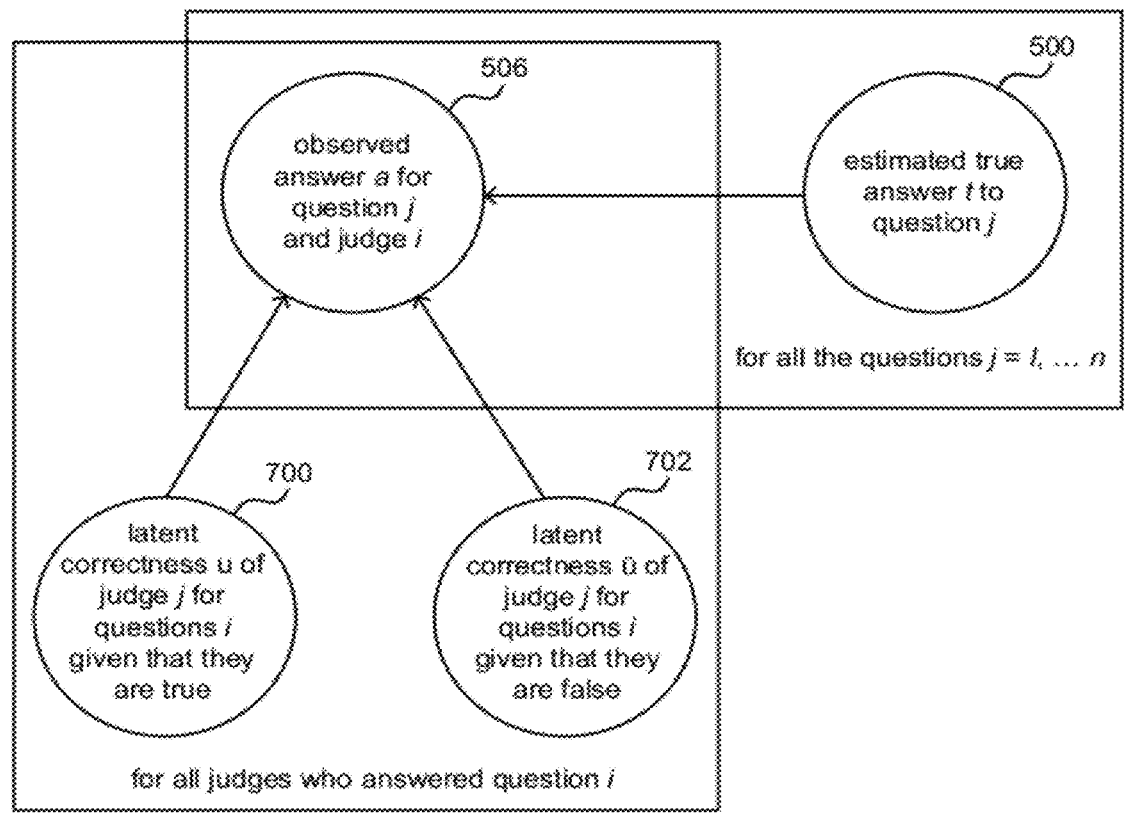
FIG. 7 is a schematic diagram of another assessment component of a probabilistic learning system having two nodes representing an expertise indicator of a judge.
Figure 8:
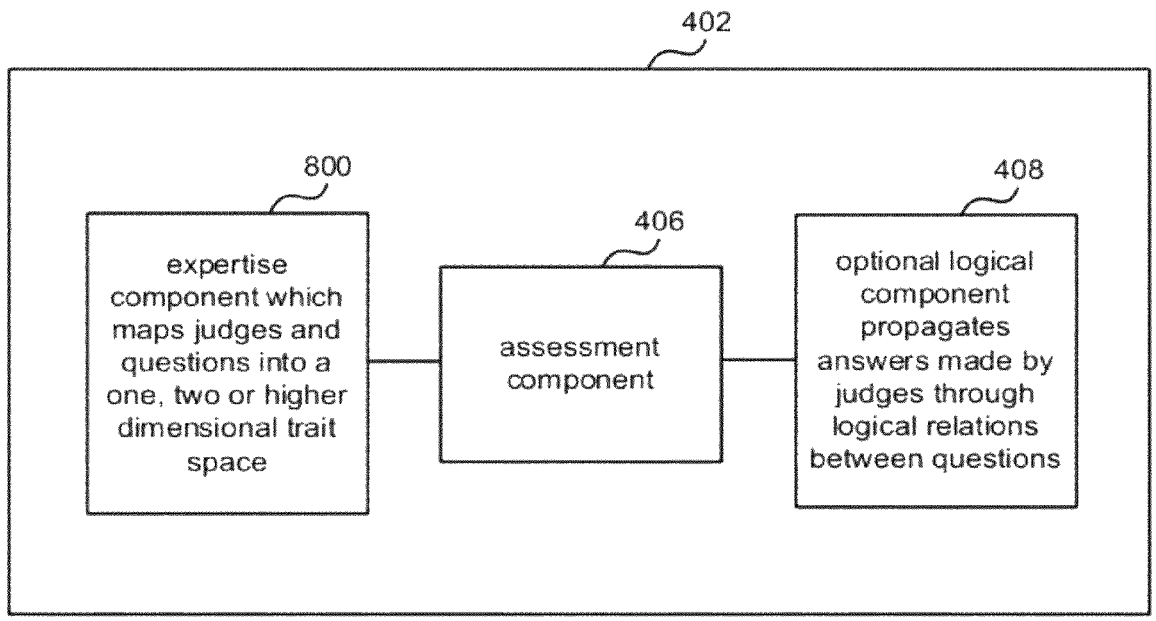
FIG. 8 is a schematic diagram of a probabilistic learning system having an assessment component and an expertise component which maps judges and questions into a trait space.

As mentioned above, in some examples the assessment component uses two nodes 700, 702 to represent a learnt expertise indicator of a judge which is not question specific as illustrated in FIG. 7. For example, the assessment component comprises a node 700 representing a latent correctness of a judge j for questions given that the answer is true and a separate node 702 representing a latent correctness of a judge j for questions given that the answer is false.

In some embodiments the factor graph data structure 402 comprises an expertise component 800 which is arranged to map judges and questions into a one, two or higher dimensional trait space. The closeness or proximity of judges and questions in trait space can indicate the expertise of a judge for a type of question. The assessment component 406 is then able to use that information about expertise of judges as it aggregates answers from judges. An optional logical component 408 propagates answers made by judges through logical relations between questions. It is not essential to use an expertise component which maps judges and questions into a trait space and in this case features of the judges and/or questions are used to assess expertise of judges by using the features to allow generalization across judges and/or questions. The use of features in this way helps mitigate data sparsity and also can be helpful when dealing with the cold start problem when new judges join the feedback crowd or when new questions are added to the knowledge base. However, it has been found that the use of an expertise component which maps judges and questions into a trait space remarkably improves the corroboration process. The mapping into trait space may be a linear mapping although this is not essential.

Figure 9:
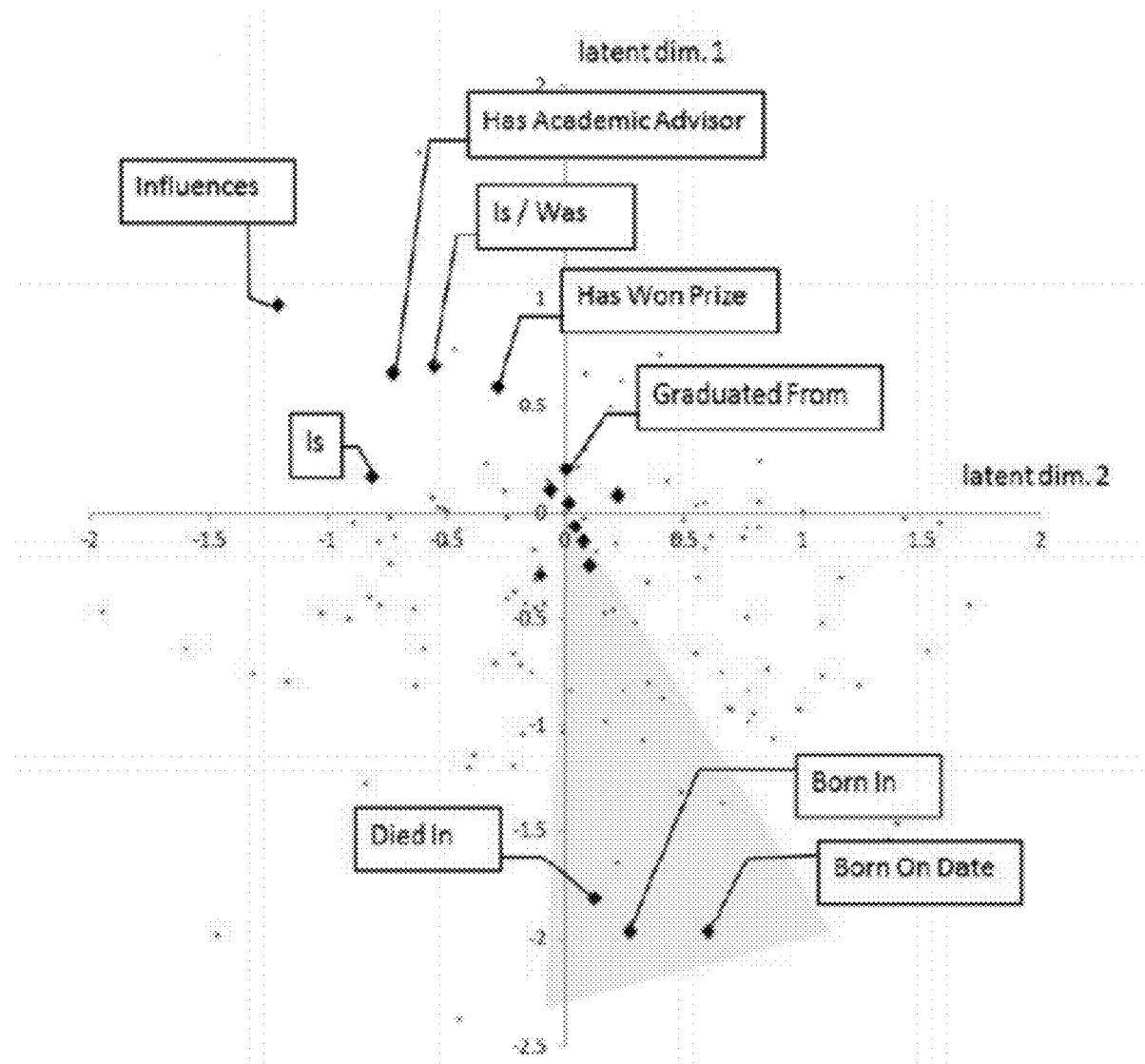
FIG. 9 is an example of a two-dimensional trait space.

FIG. 9 is an example of a two-dimensional trait space where small blob data points on the graph indicate judge traits and diamond shaped data points represent fact relation traits (which are an example of question traits). Conical shaped regions of this space such as indicated by the shaded region can be used to identify judges who are expert for particular fact relation traits.

In some embodiments an expertise component which maps judges and questions into a trait space is based on U.S. patent application Ser. No. 12/253,854 filed on 17 Oct. 2008 which is incorporated herein by reference in its entirety.

Figure 10:
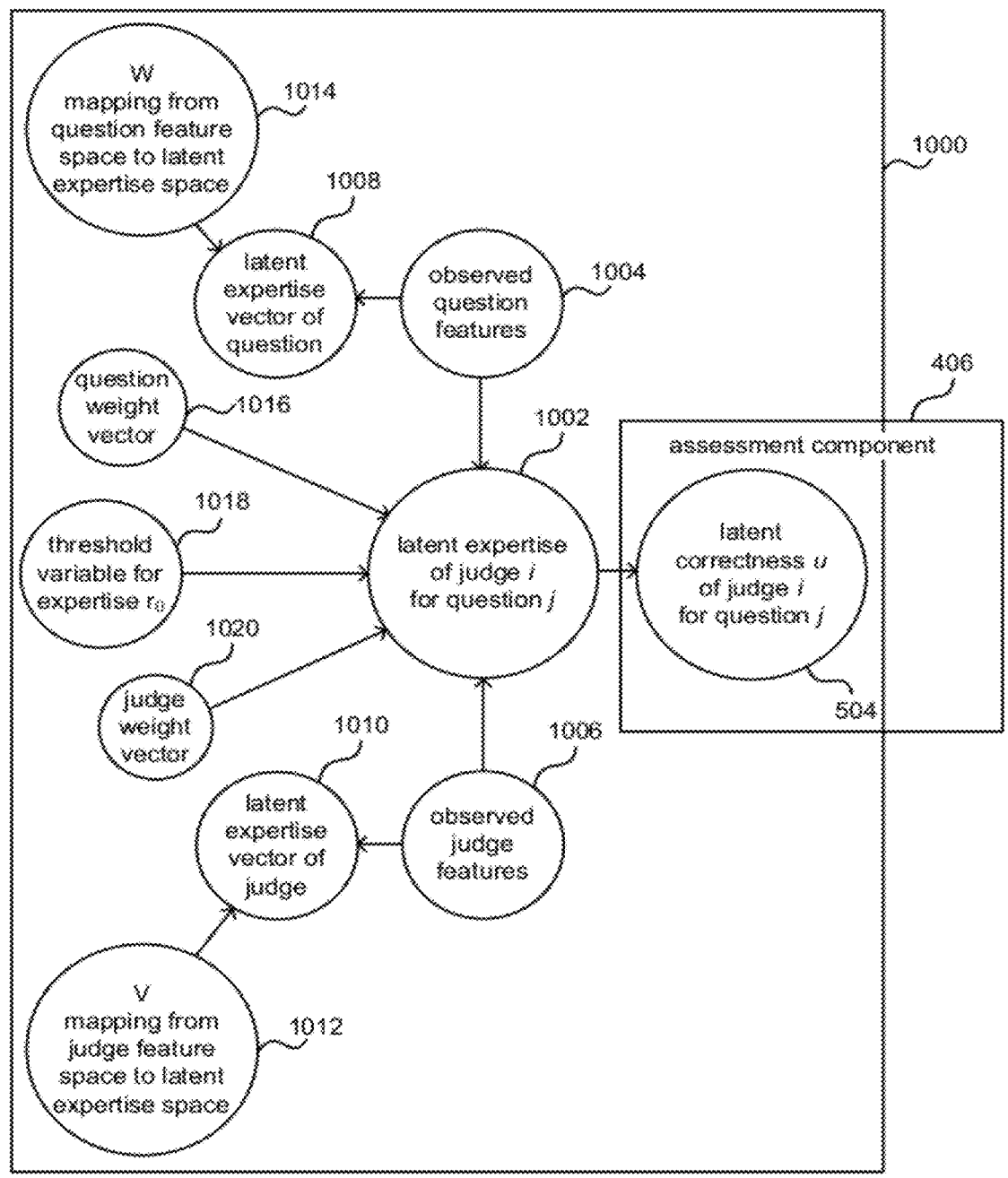
FIG. 10 is an example of an expertise component.

An example expertise component 1000 is illustrated in FIG. 10. This graphical structure maps to a factor graph data structure which is used to carry out message passing and is based on the factor graph data structure described in U.S. patent application Ser. No. 12/253,854 mentioned above. The expertise component comprises a node 1002 representing a latent expertise of judge i for question j. There are many such nodes in the expertise component, one for each judge-question combination although only one is illustrated for clarity. This node for the latent expertise links to the assessment component 406 which is partially illustrated in FIG. 10. The latent expertise node 1002 links to the node 504 for the latent correctness for the same judge question pair. In order to connect the expertise component and the assessment component in this way mappings or translations may be required that may be approximate. This is because the output of the two components may be in different forms. For example, in some embodiments Gaussian-to-Beta factors are used to connect the real-valued output of the expertise component with Boolean variables of the assessment component. This is described in more detail below.

The expertise component of FIG. 10 comprises node 1004 representing observed features of the question and node 1006 representing observed features of the judge. These link to the node 1002 representing the latent expertise of that judge for that question. The observed judge features are used to create a latent expertise vector for the judge which is represented by node 1010. This is achieved using a mapping which is represented using node 1012. In a similar manner, observed question features 1004 are used to create a latent expertise vector for the question which is represented by node 1008. This is achieved using a mapping represented by node 1014. A question weight vector 1016, a judge weight vector 1020 and a threshold variable for expertise 1018 are also represented by nodes as illustrated which link to the latent expertise node 1002. By changing the computational instructions associated with the mappings at nodes 1014 and 1012 it is possible to configure whether the expertise component maps the features into a one, two or higher dimensional trait space. For lower dimensional trait spaces the computation is typically less complex and requires less computational resource. However, the accuracy of the results may be lower. Having said that, good working results are achieved with trait spaces of one dimension as well as with two and higher dimensions. In addition, the mapping may be linear or non-linear by changing the computational instructions associated with the mappings at nodes 1014 and 1012. In some examples a linear mapping is used which is computationally less complex than a non-linear mapping and provides good results.

Figure 11:
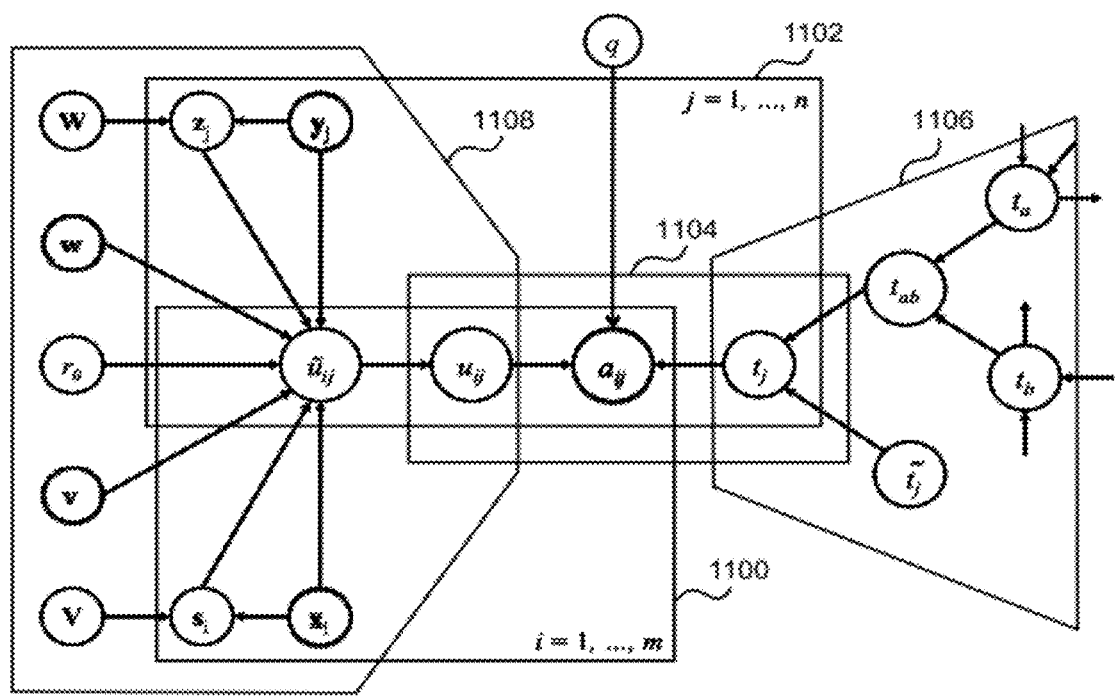
FIG. 11 is an example of a graphical structure of a probabilistic learning system.

FIG. 11 is an example graphical structure of a probabilistic learning system having an assessment component 1104, connected to each of an expertise component 1108 and a logical component 1106. The box 1100 indicates that nodes inside that box are repeated for each judge i. The box 1102 indicates that nodes inside that box are repeated for each question j. For example, m judges i may give feedback on n questions j. The questions may depend on each other through logical deduction rules. The feedback may be in the form of a truth assessment, i.e. judges say whether a statement (which is an example of a question) is true or false.

A detailed example of a probabilistic learning system such as that illustrated in FIG. 11 is now given.

In this example, assessments $a_{ij} \in \{T,F\}$ that judges i make about questions j are used in order to infer truth values $t_j \in \{T, F\}$ of questions j. The probabilistic learning system may comprise three interacting components:

An assessment component 1104 which relates an assessment $a_{ij}$ with the truth value $t_j$ of the question, the correctness $u_{ij}$ of judge i's assessment, and the guessing probability q of judges.

A logical component 1106 which describes the dependency between the truth value $t_j$ of question j and truth values $t \in D_j$ of questions from which j can be derived.

An expertise component 1108 which learns the expertise $\tilde{u}_{ij}$ of judge i for question j in terms of judge features $x_i$ and question features $y_j$, which interact via a latent expertise space.

The following notation may be used to denote the partially observed matrix of assessments by $A \in \{T,F\}^{n \times m}$, the vector of truth values of the questions by $t \in \{T,F\}^m$, and the matrix of correctness of judge assessments by $U \in \{T,F\}^{n \times m}$. A variable $q \propto \text{Beta}(\alpha, \beta)$ represents the probability that judges will guess the correct answer. A matrix of question-based judge expertise is denoted by $\tilde{U} \in \mathbb{R}^{n \times m}$, and a parameter tuple of the judge-question expertise component by $\Theta := (r_0, v, w, V, W) \in \mathbb{R} \times \mathbb{R}^{d_x} \times \mathbb{R}^{d_y} \times \mathbb{R}^{k \times d_x} \times \mathbb{R}^{k \times d_y}$. Furthermore, latent judge expertise vectors are denoted by $s_i \in \mathbb{R}^k$ and the latent question vectors by $z_j \in \mathbb{R}^k$. These variables are jointly modeled conditional on the observed judge feature vectors $x_i \in \mathbb{R}^{d_x}$, question feature vectors $y_j \in \mathbb{R}^{d_y}$, logical dependencies $D_j \in 2^{K \setminus j}$ and prior probabilities of truth $\pi_j \in [0,1]$, as expressed by the following joint probability density:

$$p(t, U, \tilde{U}, q, \{s_i\}_{i=1}^n, \{z_j\}_{j=1}^m, \Theta \mid \Omega, \Sigma) = \underbrace{p(A, U, q \mid t, \tilde{U}, \alpha, \beta)}_{AssessmentComponent} \times \underbrace{p(t \mid \{D_j\}_{j=1}^m, \{\pi_j\}_{j=1}^m)}_{LogicalComponent} \times \underbrace{p(\tilde{U}, \{s_i\}_{i=1}^n, \{z_j\}_{j=1}^m, \Theta \mid \{x_i\}_{i=1}^n, \{y_j\}_{j=1}^m, \Sigma)}_{ExpertiseComponent},\quad(5)$$

where $\Omega = \{\{D_j\}_{j-1}^m, \{\pi_j\}_{j-1}^m, \{x_i\}_{i-1}^n, \{y_j\}_{j-1}^m, \alpha, \beta\}$ represents the parameters of the prior distributions over the components of the expertise component $\Theta$ are jointly denoted by $\Sigma$. A complete reference of notation is given in FIG. 15 where the word "user" is used in place of "judge" and the word "statement" is used in place of "question".

Figure 6:
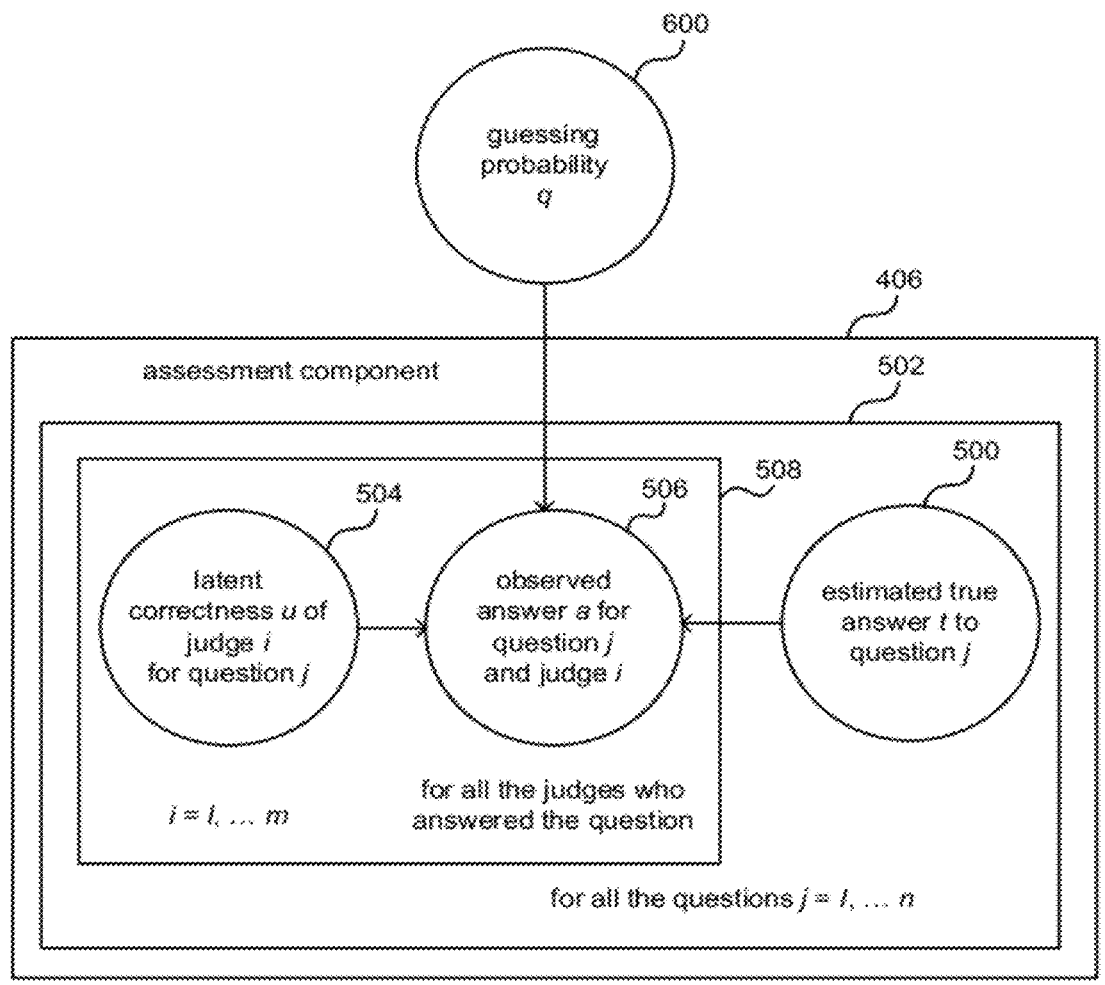
FIG. 6 is a schematic diagram of another assessment component of a probabilistic learning system having a node representing a guessing probability.

Two assessment component of FIG. 7 is based on the idea that the judge is going to report the true truth value of a statement with probability p and the opposite with probability 1−p, where p represents the reliability value of the judge. The assessment component of FIGS. 6 and 11 provides the benefit that it can capture cases in which judges may guess the correct answer. In this case, when judge i assesses question j, he will report the true truth value of j if $u_{ij}=T$, that is, if he knows j's truth value. Otherwise, with probability q: $\text{Beta}(\alpha, \beta)$ the judge will guess the true truth value of j and with probability 1−q he will guess the opposite truth value, where the $\alpha$ and $\beta$ values are learned. Consider the set $\{\alpha_{ij}\}$ of observed true/false feedback labels for question judge pairs. The joint probability distribution for assessments A and correctness values U given truth values $t \in \{T,F\}^n$ is $$p(A, U, q \mid t, \tilde{U}, \alpha, \beta) = \Pi_{i=1}^n \Pi_{j=1}^m p(a_{ij} \mid t_j, i_{ij}, q) p(u_{ij} \mid \tilde{u}_{ij}) p(q \mid \alpha, \beta), \quad (7)$$

where $\tilde{U}$ holds the corresponding prior parameters for the components of U. The function $u_{ij}$ maps T and F to 1 and 0, respectively.

The variables $\tilde{u}_{ij} \in \{T,F\}$ represent the expertise of judge i for a specific statement j. In some embodiments of the assessment component these are represented independently of the question j as a general reliability $u_{ij} = u_i$ of judge i. In other embodiments, such as that illustrated in FIG. 11 the specific areas of expertise of a judge are taken into account using an expertise component which maps judges and questions to a trait space.

More detail about the logical component of the probabilistic learning system is now given. Logical relations exist between the questions and in an example, the questions are stored in a knowledge base using a semantic-web formalism. An example of such a semantic-web formalism is now given although any suitable formalism which assigns a probabilistic value to statements made in the formalism may be used may be used.

Each statement f is assigned a probabilistic value p(f), blank nodes are forbidden, and reasoning capabilities are derived from the following deductive rules.
For all X, Y, Z ∈ Ent, R, R' ∈ Rel with X ≠ Y, Y ≠ Z, X ≠ Z, R ≠ R':

1. <X, type, Y> ∧ <Y, subClassOf, Z>
   → <X, type, Z>
2. <X, R, Y> ∧ <Y, R, Z> ∧ <R, type, TransitiveRel>
   → <X, R, Z>
3. <R, subPropertyOf, R'> ∧ <X, R, Y>
   → <X, R', Y>
4. <R, hasDomain, Dom> ∧ <X, R, Y>
   → <X, type, Dom>
5. <R, hasRange, Ran> ∧ <X, R, Y>
   → <Y, type, Ran>

Using this type of semantic-web formalism provides the benefit that the deductive closure of a knowledge base using this formalism can be constructed at least in polynomial time in the size of the knowledge base.

In an example a knowledge base K is provided with statements $f_1, f_2, \ldots, f_n$ using this type of semantic-web formalism. The deductive rules (as described above) provide logical dependencies among the questions' truth values. Furthermore, consider judges $u_1, u_2, \ldots, u_m$ who give feedback on the questions. Given descriptive judge and question features, the probabilistic learning system may jointly learn the truth values of the questions and the expertise of the judges by leveraging the logical dependencies among questions and the latent affinities between questions and judges.

In some embodiments the assessment, expertise and logical components of the probabilistic learning system comprise graphical structures which map to factor graph data structures. For example, these graphical structures may be Bayesian networks. In embodiments using the logical component the probabilistic learning system is arranged to convert logical expressions or relationships expressed using the semantic-web formalism into graphical structures of the logical component. This provides the benefit that the logical component is able to integrate with the other graphical components of the probabilistic learning system. Also, knowledge may be efficiently propagated through the graphical structure of the logical component. An example of how the relationships expressed using a semantic web formalism are translated into a Bayesian network is now given.

A knowledge base K formed using the semantic-web formalism is available in which $p(f)=1$, for each question f, is consistent when there is no cycle along deduction paths, or in other words, when no question of the form $<X, R, X>$(for any $X \in Ent$) can be derived by grounding the above rules. This is what is herein denoted as logical consistency. However, when $p(f) \neq 1$ for some questions f in K, logical consistency is no longer defined and an alternative notion of probabilistic consistency is used, in which case the deduction rules are viewed as soft constraints.

Consider the purely logical case. Let c be a question in K and let $$(a_1 \wedge b_1) \to c, \ldots, (a_l \wedge b_l) \to c \quad (1)$$

be all deductions of the conclusion c in K, where the $a_i$ and the $b_i$ can be previously derived. The following must hold:

$$\bigwedge_{i=1}^{l} ((a_i \wedge b_i) \to c) \Leftrightarrow \left( \bigvee_{i=1}^{l} \underbrace{(a_i \wedge b_i)}_{ab_i} \right) \to c \quad (2)$$

$$c \Leftrightarrow \left( \bigvee_{i=1}^{l} ab_i \right) \to c \Leftrightarrow \left( \bigvee_{i=1}^{l} ab_i \right) \vee d \longleftrightarrow c$$

where d represents the missing evidence, i.e., all missing deductions that could lead to c and only c. Note that this semantic interpretation of the variable d makes the equivalence $(\vee ab_i) \vee d \leftrightarrow c$ possible.

Figure 12:
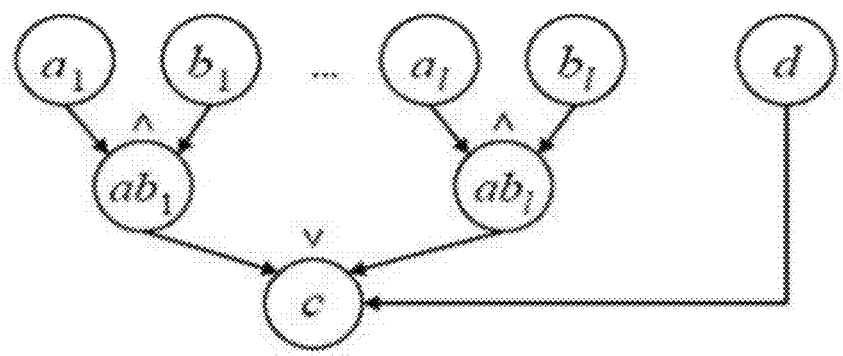
FIG. 12 is an example of part of a graphical structure of a logical component of a probabilistic learning system.

The probabilistic learning system can turn the logical formula into a Bayesian network using deterministic conditional probability tables (CPTs) that represent the logical relationships. FIG. 12 depicts the corresponding directed graphical model with additional auxiliary variables $ab_i$ representing pairwise conjunctions. FIG. 1 shows a graphical model illustrating the logical derivation for the formula $c=(a_1 \wedge b_1) \vee \ldots \vee (a_l \vee b_l) \wedge d$. Deterministic CPTs representing AND gates are marked as $\wedge$ and those representing OR gates as $\vee$. By using a node (d in FIG. 12) representing all missing deductions that could lead to a particular truth value of a question benefits are achieved. The probabilistic learning system is able to learn about the missing deductions represented by node d.

The conditional probability at a node $ab_i$ is given by:

(equation 3)

$$P(ab_i = T \mid a_i, b_i) = \begin{cases} 1 & \text{if } a_i \wedge b_i \\ 0 & \text{otherwise} \end{cases} \quad (3)$$

This simplifies a disjunctive normal form to the expression $c = ab_1 \vee \ldots \vee ab_l \vee d$. Finally, the system connects c with all the variables in the disjunctive normal form by a conditional probability:

(equation 4)

$$P(c = T \mid ab_1, \ldots, ab_l, d) = \begin{cases} 1 & \text{if } ab_1 \vee \ldots \vee ab_l \vee d \\ 0 & \text{otherwise} \end{cases} \quad (4)$$

In an example of a logical component, each question $f_j$ in a knowledge base K is assigned a binary variable $t_j \in \{T, F\}$. For example, each truth value $t_j$ of a question that can be logically deduced by a set of premises $D_j$ from K is connected with the truth values of questions in $D_j$ through $p(t_j | D_j, \tilde{t}_j)$ as described above. Each question $f_j$ for which there exists no premises in K is assigned $p(t_j) := \text{Bernoulli}(\pi_j)$ as a prior, where the binary variable $t_j$ accounts for the deduction through missing premises. Defining $$p(t_j \mid \tilde{t}_j, D_j, \pi_j) := \sum_{\tilde{t}_j \in \{T, F\}} p(t_j \mid \tilde{t}_j, D_j) p(\tilde{t}_j \mid \pi_j)$$

the "prior" distribution for t factorizes as $$p\left(t \mid \{D_j\}_{j=1}^{m}, \{\pi_j\}_{j=1}^{m}\right) = \prod_{j=1}^{m} p(t_j \mid \tilde{t}_j, D_j, \pi_j), \quad (6)$$

where Equations (3) and (4) specify the conditional distribution $p(t_j | t_j, D_j)$.

More detail about an example of an expertise model is now given. The mathematical expression for the expertise model given above factorizes as:

$$p\left(\tilde{U}, \{s_i\}_{i=1}^{n}, \{z_j\}_{j=1}^{m}, \Theta \mid \{x_i\}_{i=1}^{n}, \{y_j\}_{j=1}^{m}, \Sigma\right) = \quad (8)$$

$$\prod_{i=1}^{n} \prod_{j=1}^{m} N(\tilde{u}_{ij}; s_i^T z_j + x_i^T v + y_j^T w + r_0, \beta^2) \times$$

$$\prod_{l=1}^{k} \delta(s_{ik} - x_i^T v_k) \delta(z_{jk} - y_j^T w_k) \pi(r_0, v, w, V, W),$$

where $\pi(r_0, v, w, V, W)$ is a fully factorizing Gaussian prior over $r_0$, v, w, V, and W whose parameters are jointly denoted by $\Sigma$ above. Intuitively, the model can be thought of as mapping both judges $x_i$ and questions $y_j$ into a k-dimensional latent knowledge space, with $s_i = V^T x_i$ and $z_j = W^T y_j$. The question-dependent judge expertise $\tilde{u}_{ij}$ is then modeled as the inner product $s_i^T z_j$ between the latent expertise vectors. In addition, purely judge or question related effects are modeled with linear models, $x_i^T v$ and $y_j^T w$, together with an overall threshold $r_0$.

The judge and question features, as represented by the vectors $x_i$, $y_j$, can be seen as characterizing descriptions that allow generalizations across judges and questions.

In this example, the assessment model and the expertise model may be connected by a sigmoid factor $$p(u_{ij} | \tilde{u}_{ij}) = \pi = \frac{e^{\tilde{u}_{ij}}}{1 + e^{\tilde{u}_{ij}}}.$$

Since the expertise model achieves efficient inference using a fully factorised Gaussian approximation the system approximates the marginal distribution, $p(\tilde{u}_{ij})$ using a Gaussian. This is achieved by using a Laplace approximation to a Beta distribution Beta(p; a, b) after changing the basis of the Beta distribution via the sigmoid, following. For $p(\tilde{u}_{ij})$: N $(\mu, \sigma^2)$ this gives $$p(u_{ij}) = Ber\left(u_{ij}, \frac{a}{a+b}\right) \text{ where } a = \frac{e^{\mu} + 1}{\sigma^2} \text{ and } b = \frac{e^{-\mu} + 1}{\sigma^2}.$$

As mentioned above the graphical structure of the components of the probabilistic learning system may be implemented as a factor graph. In an example such as the example of FIG. 1 there are six types of factor nodes in the factor graph. However, the types of factor nodes used will vary depending on the types of components used in the probabilistic learning system. The six types may be as follows: (1) logical factors connecting Bernoulli variables, (2) Beta-Bernoulli factors in the assessment component, (3) product factors, (4) linear combination factors, and (5) Gaussian factors in the expertise component, and (6) Gaussian-to-Beta factors for connecting the real-valued output of the expertise component with the Boolean variables of the assessment component. Inference in the factor graph can be performed using approximate message passing based on a combination of expectation propagation (EP) and variational message passing (VMP). VMP may be used for the product factor in the inner product of the expertise component. On the assessment and logical components, the inference may be handled by EP. In an example, the inference in the expertise model may be run based on Gaussian messages; the assessment model uses Beta and Bernoulli messages; and the logical model runs inference based on Bernoulli messages. Note that each of the components can be used as an independent module. This makes the system a flexible compositional corroboration system. For the inference schedule across the components, it is possible to start out by running inference on the expertise component and then switch iteratively between this and the remaining components. However, other inference schedules may be used such as iterating over feedbacks, judges, or questions.

Figure 13:
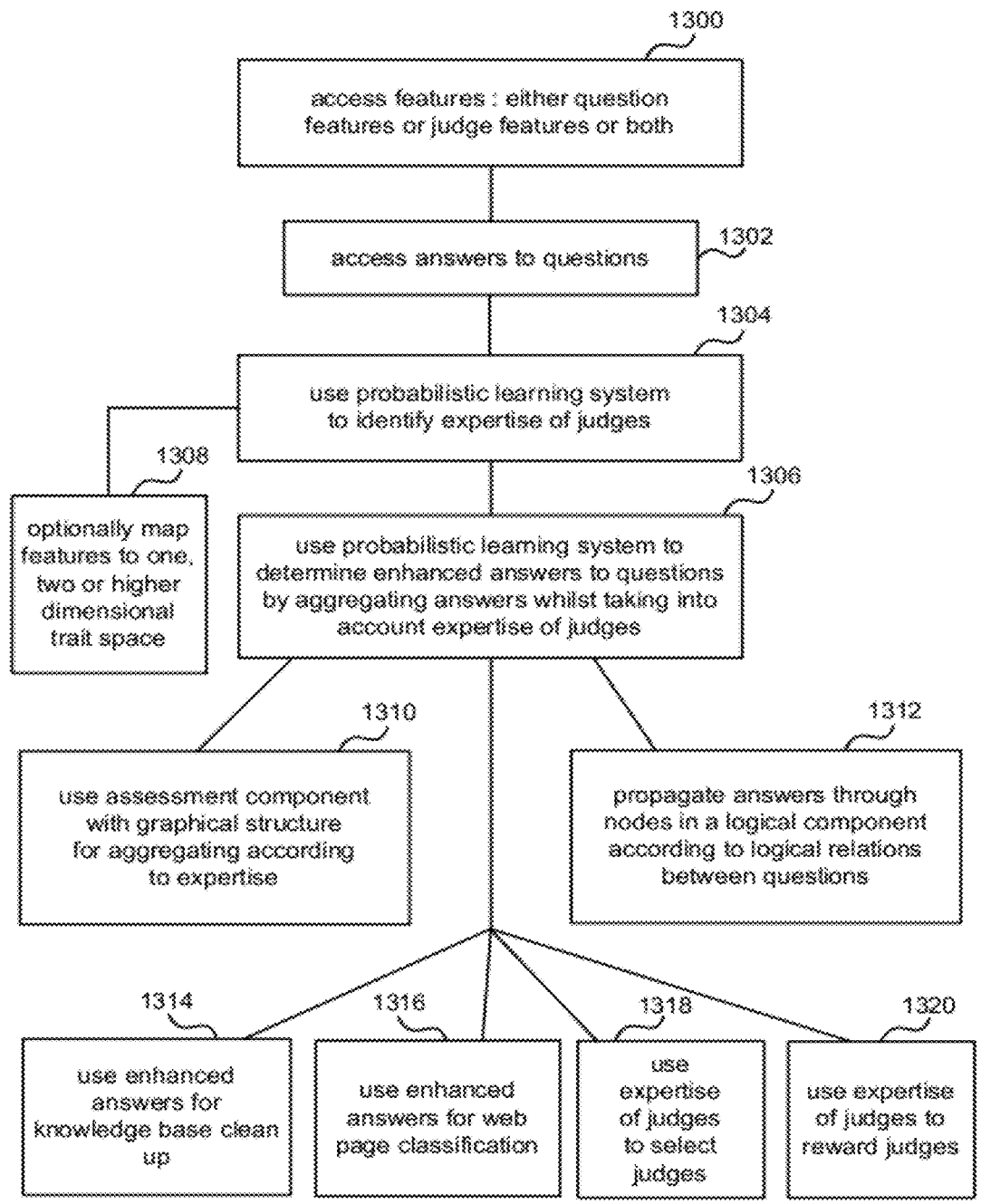
FIG. 13 is a flow diagram of a method at a probabilistic learning system.

FIG. 13 is a flow diagram of an example method at a probabilistic learning system. Features are accessed which are either judge features or question features or both. As mentioned above the features may be identifiers of judges or questions or may be other attributes of judges or questions. Answers to the questions made by the judges are accessed 1302. The probabilistic learning system uses the features to identify 1304 an expertise of each judge, either an overall expertise or one expertise indicator per judge-question pair. This is achieved using an expertise component of the probabilistic learning system. In some cases this component maps 1308 the features to a one, two or higher dimensional trait space where proximity in the trait space is an indication of expertise of a judge for a type of question. The probabilistic learning system is used to determine 1306 enhanced answers to the questions by aggregating the answers whilst taking into account the identified expertise of the judges. This enables the wisdom of the crowds to be exploited whilst taking into account judges with different levels of expertise for different types of question and judges who give malicious answers. In order to do this the probabilistic learning system may use 1310 an assessment component with a graphical structure for aggregating according to expertise. It may also propagate 1312 answers through nodes in a logical component according to logical relations between questions. In some cases the enhanced answers may be used 1314 for knowledge base clean-up. The enhanced answers may also be used 1316 for web page classification in some embodiments. In some cases the expertise of the judges may be used to select 1318 judges to answer further questions and/or to reward judges 1320

Figure 14:
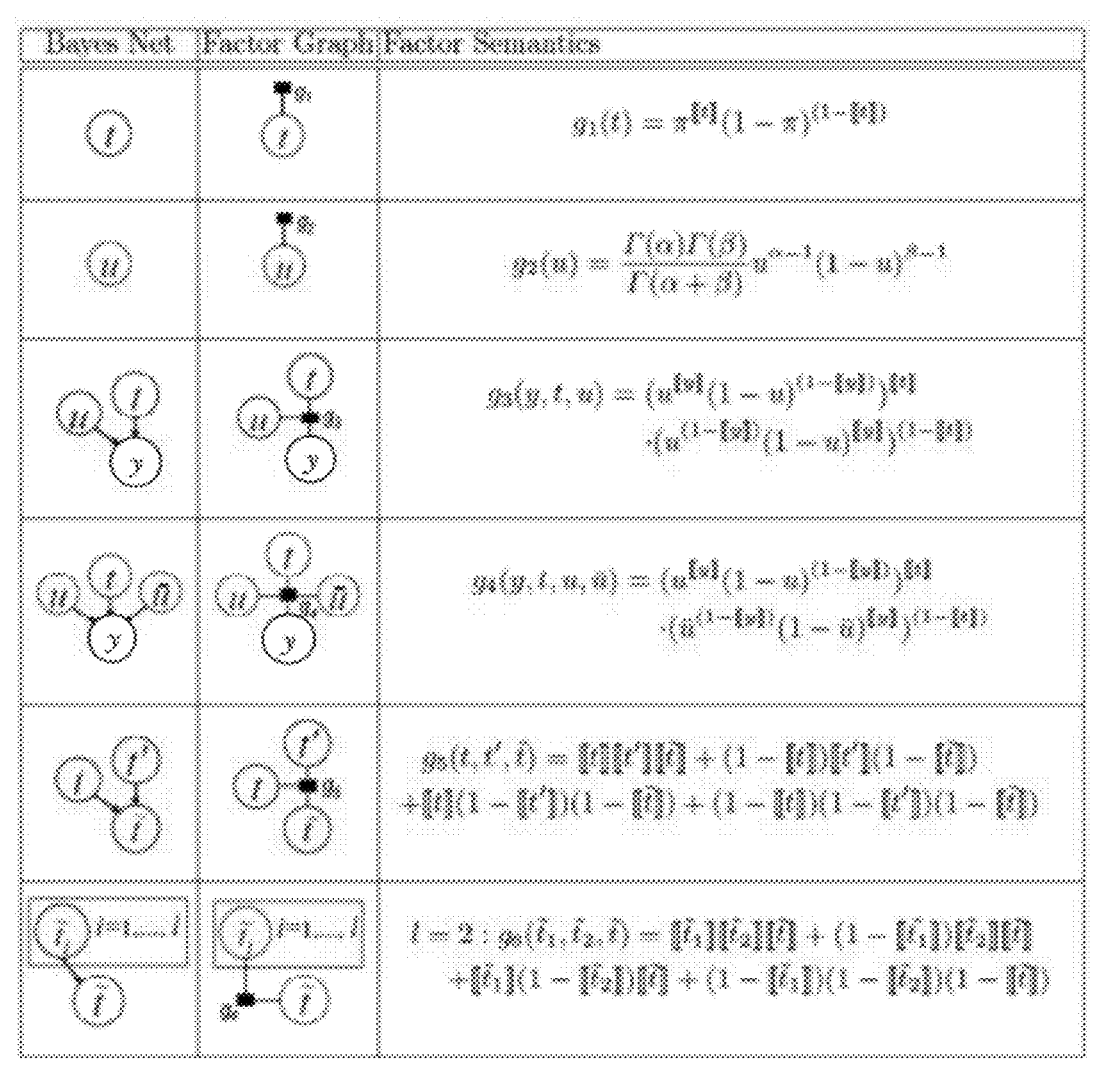

FIG. 14 is a table showing how graphical components of the probabilistic learning system may be mapped to factor graph structures. The computational instructions associated with the factor graph nodes are also given.

FIG. 15 shows symbols used in this document and their meanings.

In the examples described above the ground truth of the questions is not known and the true expertise of the judges is not known. However, in some embodiments it is possible to present the judges with a mixture of questions where the answers to some of the questions is known as ground truth. This enables the reliability of the judges to be assessed against the ground truth for some of the questions and this knowledge may be used by the expertise component. In this way the expertise component has enhanced accuracy and is able to provide input to the assessment component which in turn enhances the answers to the questions where ground-truth is not available.

Figure 16:
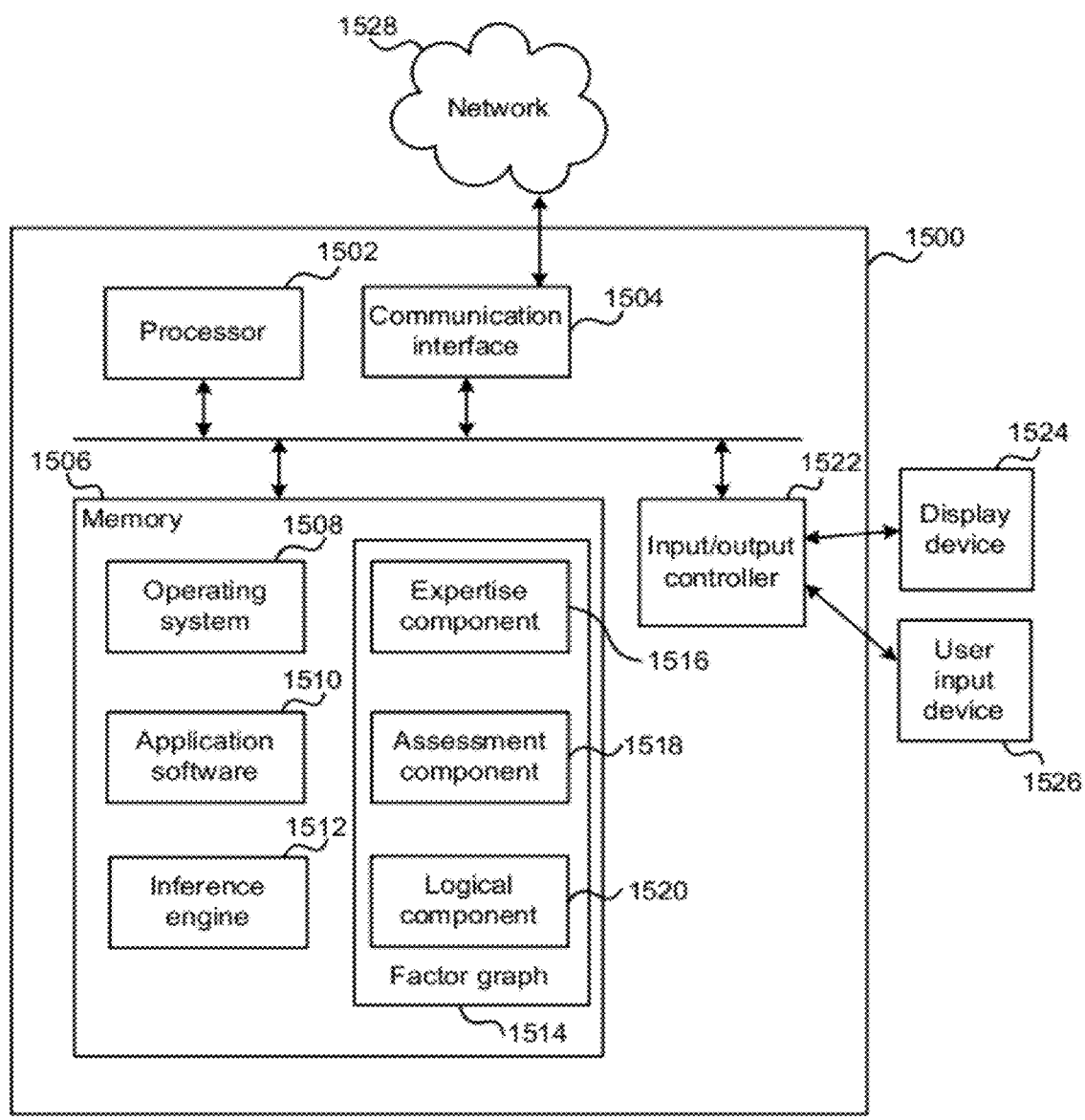
FIG. 16 illustrates an exemplary computing-based device in which embodiments of a knowledge corroboration system may be implemented.

FIG. 16 illustrates various components of an exemplary computing-based device 1500 which may be implemented as any form of a computing and/or electronic device, and in which embodiments of device management may be implemented.

Computing-based device 1500 comprises one or more processors 1502 which may be microprocessors, controllers or any other suitable type of processors for processing computing executable instructions to control the operation of the device in order to manage groups of devices. In some examples, for example where a system on a chip architecture is used, the processors 1502 may include one or more fixed function blocks which implement a part of the method of managing groups of computing devices in hardware (rather than software or firmware). Platform software comprising an operating system 1508 or any other suitable platform software may be provided at the computing-based device to enable application software 1510 to be executed on the device. An inference engine 1512 for carrying out inference on a factor graph data structure 1514 is provided. The factor graph data structure 1514 comprises an expertise component 1516 and an assessment component 1518. It optionally comprises a logical component 1520.

The computer executable instructions may be provided using any computer-readable media that is accessible by computing based device 1500. Computer-readable media may include, for example, computer storage media such as memory 1506 and communications media. Computer storage media, such as memory 1506, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 1506) is shown within the computing-based device 1500 it will be appreciated that the storage may be distributed or located remotely and accessed via a network 1528 or other communication link (e.g. using communication interface 1504).

An output is also provided such as an audio and/or video output to a display system integral with or in communication with the computing-based device. The display system may provide a graphical user interface, or other user interface of any suitable type although this is not essential.

The computing-based device 1500 also comprises an input/output controller 1522 arranged to output display information to a display device 1524 which may be separate from or integral to the computing-based device 1500. The display information may provide a graphical user interface. The input/output controller 1522 is also arranged to receive and process input from one or more devices, such as a user input device 1526 (e.g. a mouse or a keyboard). This user input may be used to input user designed management scenarios. In an embodiment the display device 1524 may also act as the user input device 1526 if it is a touch sensitive display device. The input/output controller 1522 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of obtaining enhanced answers to a plurality of questions comprising:

accessing features comprising any one or more of: at least one feature for each of a plurality of judges, and at least one feature for each of the questions;

accessing at least one answer for each question given by one of the judges and, for a plurality of the questions, more than one answer given by different ones of the judges;

using a probabilistic learning system to learn an expertise of each judge using the features, the probabilistic learning system using at least a first question for which an answer is known as ground truth and a second question for which a ground truth answer is unknown, true answers to at least some of the questions being unknown to the probabilistic learning system and true expertise of the judges for the questions being unknown to the probabilistic learning system, an enhanced answer to a question being more likely to be accurate than a corresponding answer before application of the probabilistic learning system; and using the probabilistic learning system to determine enhanced answers to the questions by aggregating the answers in a manner which takes into account the identified expertise of the judges by weighting answers of the judges based on the identified expertise of the judges.

2. A method as claimed in claim 1 wherein accessing features comprises accessing question features and judge features and wherein using the probabilistic learning system to identify an expertise of each judge comprises mapping the question features and judge features into a trait space which may be any of: a one dimensional trait space, a two dimensional trait space, a trait space of higher dimension than two.

3. A method as claimed in claim 2 wherein mapping the judges and questions into a trait space is achieved using a linear mapping.

4. A method as claimed in claim 1 wherein using the probabilistic learning system to determine enhanced answers to the questions comprises using an assessment component of the probabilistic learning system having a graphical structure for aggregating the answers comprising, a node representing a learnt enhanced answer connected to, one node for each observed answer to be aggregated to the learnt enhanced answer, each of the nodes for the observed answers being connected to at least one node representing a learnt expertise indicator of a judge who gave the observed answer.

5. A method as claimed in claim 4 wherein using the probabilistic learning system to determine enhanced answers comprises taking into account cases in which judges guess correct answers to the questions.

6. A method as claimed in claim 4 which comprises using a node representing a learnt guessing probability connected to each of the nodes for the observed answers; the learnt guessing probability representing a probability that, in the event that a judge does not know the answer to a question, the judge will guess the correct answer to that question.

7. A method as claimed in claim 4 which comprises using two nodes representing a learnt correctness of the judge who gave the answer, one of those nodes representing the probability that the judge reported the correct answer given the correct answer was true and the other node representing the probability that the judge reported the correct answer given the correct answer was false.

8. A method as claimed in claim 1 wherein using the probabilistic learning system to determine enhanced answers to the questions comprises propagating answers made by the judges through nodes in a logical component of the probabilistic learning system according to logical relations between the questions.

9. A method as claimed in claim 8 wherein at least one node in the logical component represents all missing deductions that could lead to a specified enhanced answer.

10. A method as claimed in claim 1 wherein using the probabilistic learning system comprises: forming a factor graph data structure in memory with variable nodes storing statistics describing probability distributions representing learnt knowledge about expertise of the judges and about enhanced answers and factor nodes storing computational instructions; and carrying out probabilistic inference using message passing over the factor graph by executing the computational instructions and storing the results at the variable nodes.

11. A method as claimed in claim 1 which comprises using the enhanced answers and the learnt expertise of the judges to update a knowledge base storing the questions and associated answers.

12. A method as claimed in claim 1 wherein the questions are documents to be classified into specified categories and wherein the answers are the specified categories; and wherein the method comprises using the enhanced answers and the learnt expertise of the judges to update a knowledge base storing associations between the categories and references to the documents.

13. A method as claimed in claim 1 which comprises using the learnt expertise of the judges to select which of the judges to use for future questions.

14. A method as claimed in claim 1 which comprises using the learnt expertise of the judges to reward judges based on that learnt expertise.

15. A probabilistic learning system comprising:
one or more processors;
an input operable with the one or more processors and arranged to access features comprising any one or more of: at least one feature for each of a plurality of judges, and at least one feature for each of the questions;
the input also arranged to access at least one answer for each question given by one of the judges and, for a plurality of the questions, more than one answer given by different ones of the judges;
using an inference engine arranged to carry out inference using a graphical structure of the probabilistic learning system to learn an expertise of each judge using the features and to determine enhanced answers to the questions by aggregating the answers in a manner which takes into account the identified expertise of the judges, the inference engine being configured use to at least a first question for which an answer is known as ground truth and a second question for which a ground truth answer is unknown to learn the expertise of each judge, true answers to at least some of the questions being unknown to the probabilistic learning system and true expertise of the judges for the questions being unknown to the probabilistic learning system, an enhanced answer to a question being more likely to be accurate than a corresponding answer before application of the probabilistic learning system.

16. A probabilistic learning system as claimed in claim 15 wherein the graphical structure comprises an assessment component an expertise component and a logical component with the expertise and logical components both connected to the assessment component.

17. A probabilistic learning system as claimed in claim 15 wherein the expertise component comprises nodes representing the features and nodes which map those features into a trait space.

18. A method of obtaining enhanced answers to a plurality of questions comprising:
accessing features comprising any one or more of: at least one feature for each of a plurality of judges, and at least one feature for each of the questions;
accessing at least one answer for each question given by one of the judges and, for a plurality of the questions, more than one answer given by different ones of the judges;
using a probabilistic learning system to learn an expertise of each judge using the features; and using the probabilistic learning system to determine enhanced answers to the questions by aggregating the answers in a manner which takes into account the identified expertise of the judges, the probabilistic learning system using at least a first question for which an answer is known as ground truth and a second question for which a ground truth answer is unknown, the at least first question being used to determine a reliablity of the judges, true answers to at least some of the questions being unknown to the probabilistic learning system and true expertise of the judges for the questions being unknown to the probabilistic learning system, an enhanced answer to a question being more likely to be accurate than a corresponding answer before application of the probabilistic learning system;

wherein using the probabilistic learning system to determine enhanced answers to the questions comprises using an assessment component of the probabilistic learning system having a graphical structure for aggregating the answers comprising, a node representing a learnt enhanced answer connected to, one node for each observed answer to be aggregated to the learnt enhanced answer, each of the nodes for the observed answers being connected to at least one node representing a learnt expertise indicator of a judge who gave the observed answer.

19. A method as claimed in claim 18 wherein using the probabilistic learning system to determine enhanced answers to the questions comprises propagating answers made by the judges through nodes in a logical component of the probabilistic learning system according to logical relations between the questions.

* * * * *